United States Patent
Xu et al.

(10) Patent No.: US 11,391,145 B2
(45) Date of Patent: Jul. 19, 2022

(54) DYNAMIC FRACTURE WIDTH CALCULATION METHOD FOR DRILLING FLUID LOSS IN FRACTURED FORMATION

(71) Applicant: Southwest Petroleum University, Chengdu (CN)

(72) Inventors: Chengyuan Xu, Chengdu (CN); Xinglin Yang, Chengdu (CN); Yili Kang, Chengdu (CN); Lijun You, Chengdu (CN); Yingrui Bai, Qingdao (CN); Ling Lin, Chengdu (CN); Chuan Liu, Chengdu (CN); Jingyi Zhang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/515,569

(22) Filed: Nov. 1, 2021

(65) Prior Publication Data

US 2022/0136387 A1    May 5, 2022

(30) Foreign Application Priority Data

Nov. 2, 2020   (CN) .......................... 202011204511.7

(51) Int. Cl.
*E21B 49/00* (2006.01)
*E21B 43/26* (2006.01)
(Continued)

(52) U.S. Cl.
CPC .............. *E21B 49/00* (2013.01); *E21B 43/26* (2013.01); *G06F 30/20* (2020.01);
(Continued)

(58) Field of Classification Search
CPC .......... E21B 49/00; E21B 43/26; G06F 30/20; G06F 2111/10
(Continued)

(56) References Cited

U.S. PATENT DOCUMENTS 3,659,651 A * 5/1972 Graham ................ E21B 43/267
507/924
3,664,420 A * 5/1972 Graham .................... C09K 8/80
166/280.2

(Continued)

FOREIGN PATENT DOCUMENTS

CN    112127882 B    5/2021

OTHER PUBLICATIONS

Kang et al. ("Comprehensive prediction of dynamic fracture width for formation damage control in fractured tight gas reservoir", Int. J. Oil, Gas and Coal Technology, vol. 9, No. 3, 2015, pp. 296-310) (Year: 2015).*

(Continued)

*Primary Examiner* — Iftekhar A Khan

(57) ABSTRACT

The invention relates to a dynamic fracture width calculation method for drilling fluid loss in a fractured formation, which belongs to the field of loss control of drilling and well completion engineering, and includes the following steps: selecting a model according to seismic data and fracture development characteristics and calculating a static hydraulic width of a formation fracture; substituting the static hydraulic width of the formation fracture into a deformation formula of a fracture hydraulic width, to obtain a dynamic hydraulic width of a wellbore fracture; converting the dynamic hydraulic width of the wellbore fracture into an average mechanical width of the wellbore fracture, according to a conversion relational formula of a mechanical width; and solving a mechanical width distribution range of the fracture according to a standard deviation of a mechanical width distribution of a natural fracture.

4 Claims, 4 Drawing Sheets

(51) Int. Cl.
*G06F 30/20* (2020.01)
*G06F 113/08* (2020.01)
*G06F 111/10* (2020.01)

(52) U.S. Cl.
CPC ....... *E21B 2200/20* (2020.05); *G06F 2111/10* (2020.01); *G06F 2113/08* (2020.01)

(58) Field of Classification Search
USPC .......................................................... 703/2
See application file for complete search history.

(56) References Cited

U.S. PATENT DOCUMENTS

| | | | | |
|---|---|---|---|---|
| 3,710,865 A * | 1/1973 | Kiel | ................. | C09K 8/64 166/308.4 |
| 5,934,373 A * | 8/1999 | Warpinski | ................. | G01V 1/52 166/308.1 |
| 10,400,550 B2 * | 9/2019 | Gu | ................. | E21B 43/26 |
| 2004/0206495 A1 * | 10/2004 | Lehman | ................. | E21B 43/26 166/308.1 |
| 2008/0162099 A1 * | 7/2008 | Vega Velasquez | ...... | E21B 43/26 703/10 |
| 2008/0183451 A1 * | 7/2008 | Weng | ................. | E21B 43/267 166/250.1 |
| 2010/0181073 A1 * | 7/2010 | Dupriest | ................. | E21B 21/00 166/308.1 |
| 2010/0307755 A1 * | 12/2010 | Xu | ................. | E21B 43/26 703/2 |
| 2014/0151033 A1 * | 6/2014 | Xu | ................. | E21B 41/0092 166/308.1 |
| 2015/0198028 A1 * | 7/2015 | Kim | ................. | G01V 1/30 702/14 |
| 2016/0010443 A1 * | 1/2016 | Xu | ................. | E21B 47/07 166/250.1 |
| 2016/0265331 A1 * | 9/2016 | Weng | ................. | G06F 30/20 |
| 2016/0320528 A1 * | 11/2016 | Kuznetsov | ................. | G01V 99/005 |
| 2016/0370499 A1 * | 12/2016 | Berard | ................. | E21B 43/26 |
| 2017/0343689 A1 * | 11/2017 | Dykstra | ................. | G01V 1/288 |
| 2018/0230783 A1 * | 8/2018 | Weng | ................. | E21B 47/10 |
| 2018/0340873 A1 * | 11/2018 | Zhang | ................. | G01N 3/00 |
| 2019/0330975 A1 * | 10/2019 | Martysevich | ................. | E21B 47/10 |
| 2021/0079788 A1 * | 3/2021 | Wang | ................. | E21B 47/06 |

OTHER PUBLICATIONS

Zhang et al. (Numerical 3D-simulation of dynamic natural fracture width for lost circulation control in deep fractured tight reservoir, ARMA, 2020, pp. 1-9) (Year: 2020).*

Dong et al. ("Experimental and Theoretical Study on Dynamic Hydraulic Fracture", Energies 2019, pp. 1-33) (Year: 2019).*

Xu et al. ("Stochastic modelling of particulate suspension transport for formation damage prediction in fractured tight reservoir", Elsevier, 2018, pp. 476-490) (Year: 2018).*

* cited by examiner

DYNAMIC FRACTURE WIDTH CALCULATION METHOD FOR DRILLING FLUID LOSS IN FRACTURED FORMATION

CROSS-REFERENCE TO RELATED APPLICATION

This application claims priority to Chinese Patent Application No. 202011204511.7 entitled "DYNAMIC FRACTURE WIDTH CALCULATION METHOD FOR DRILLING FLUID LOSS IN FRACTURED FORMATION" and filed on Nov. 2, 2020, the content of which is hereby incorporated by reference in its entirety.

BACKGROUND

1. Technical Field

The present disclosure generally relates to a technical field of loss control in drilling and completion engineering, and especially relates to a dynamic fracture width calculation method for drilling fluid loss in a fractured formation.

2. Description of Related Art

In a fractured oil-gas reservoir, a natural fracture is not only an effective space for oil-gas storage, but also a seepage channel for oil-gas migration, which plays an important role in efficient development of oil-gas resources. Although the natural fracture is conducive to an efficient production of oil-gas, the fracture can cause loss of working fluid during drilling and completion, resulting in a series of damages, mainly including: a large amount of drilling fluid is lost, resulting in economic loss; a pressure in a well is reduced, so that well collapse or blowout is easily induced, to influence drilling safety thereof; a non-production time is increased to affect drilling effectiveness; in an actual drilling and completion process, solid-phase particles of the drilling fluid are easy to invade a reservoir formation to block the fracture, reduce seepage capability of the fracture, damage the reservoir formation, and affect an oil-gas yield. Well loss is generated under a combination of various factors, Xu, tong tai and others believe that the well loss should meet three conditions: a pressure of the working fluid within a wellbore is greater than a fluid pressure in pores of the formation, and a positive pressure difference exists in the formation; there are loss channels and enough loss spaces for containing liquid in the formation; and a size of an opening of the loss channel is larger than a particle size of a solid phase in external working fluid.

At present, a main way of loss control is to add plugging materials with different efficacies and different particle sizes into drilling fluid to form a loss-proof and plugging formula matched with a width of the loss fracture, so as to successfully block the loss fracture and form a plugging layer with a certain pressure bearing capacity. A width of the loss fracture is the key of designing the loss-proof and plugging formula, and also is a difficult problem which always troubles engineers. A main reason is that an accuracy of a conventional loss fracture width calculation model is reduced mainly by a coupling effect of non-Newtonian flow characteristics of the drilling fluid and deformation characteristics of the formation fracture, and roughness of fracture surfaces, at the same time, performance of the plugging material and the drilling fluid is reduced under an environment with a high temperature, a high pressure and high ground stress, and matching performance of the loss-proof plugging formula and the loss fracture is also reduced. Therefore, a dynamic width calculation method of the loss fracture by simultaneously considering the width deformation characteristics of the formation fracture and the roughness of the fracture surface is needed to improve accuracy of calculating the width of the loss fracture, so as to design the loss and plugging formula efficiently and timely, plug the loss fracture and reduce loss damage.

SUMMARY

The technical problems to be solved: in view of the shortcomings of the related art, the present disclosure relates to a dynamic fracture width calculation method for drilling fluid loss in a fractured formation, which can consider dynamic changes of fracture widths and roughness of fracture surfaces and provide a natural fracture width calculation model, solve the problems of difficulty calculating widths of the loss fracture caused by the dynamic change of widths in a stress-sensitive formation fracture, and low calculation accuracy of the fracture width caused by a rough fracture surface, and can provide a basis for designing a particle size distribution of the loss-proof and plugging formula in the stress-sensitive formation, so as to design the loss-proof and plugging formula timely and efficiently and reduce loss damage. A specific scheme of the present disclosure is as follows:

A dynamic fracture width calculation method for drilling fluid loss in a fractured formation includes the following steps:

step S1, selecting a model according to seismic data and fracture development characteristics and calculating a static hydraulic width of a formation fracture;

preferably, three models are provided, and a loss space for providing a constant-pressure boundary is involved to be determined in the model selection process. The loss space for providing the constant-pressure boundary in the present disclosure actually refers to that, when a fracture tip is connected with a larger loss space (such as a large karst cave and an underground river, etc.), an outer boundary condition of the fracture can be approximately regarded as the constant-pressure boundary, which can be determined by one of ordinary skill in the related art through the seismic data, and belongs to an industry common knowledge. There is a plurality of determination methods thereof, for example, Li, da qi provides a determination method in contents of "study on drilling fluid loss dynamics in fractured formation", which will not be detailed herein. The model selection method, a specific derivation process of the model and the static hydraulic width calculation method of the formation fracture are as follows:

a first model:

selecting a model that is applied to conditions that the seismic data shows that no loss space for providing a constant-pressure boundary exists in a formation, and horizontal or inclined fractures are developed in the formation.

A derivation process is as follows:

neglecting filtration loss of wall surfaces in the fracture, considering deformation characteristics of the fracture width and compressibility of fluid, a continuity equation of an one-dimensional radial fracture when the working fluid leaks is as follows:

$$-\frac{1}{r}\frac{\partial}{\partial r}(\rho w_h v r) = \frac{\partial(\rho w_h)}{\partial t} \tag{1}$$

wherein: r is a radius; $\rho$ is a density of the working fluid; $w_h$ is a fracture hydraulic width under different intra-fracture pressures P; v is a flow rate of the working fluid; t is a time.

A deformation equation of the fracture hydraulic width is as follows:

$$w_h = w_0 e^{\frac{\beta_f(\alpha P - \alpha P_p)}{3}} \tag{2}$$

wherein: $w_0$ is a fracture hydraulic width under conditions of the formation pressure, also known as a fracture static hydraulic width; $\alpha$ is a Biot coefficient; $\beta_f$ is a deformation coefficient of the fracture hydraulic width that can be obtained by fitting a stress sensitivity experiment of a fracture rock sample; P is an intra-fracture pressure of the fracture; $P_p$ is a formation pressure.

A state equation of the working fluid is as follows:

$$\rho = \rho_0 e^{C_\rho(P-P_p)} \tag{3}$$

wherein: $\rho$ is the density of the working fluid; $\rho_0$ is a density of the working fluid under conditions of the formation pressure; $C_p$ is a compression factor of the working fluid.

A motion equation of the working fluid is as follows:

$$v = -\frac{w_h^2}{12\mu}\frac{\partial P}{\partial r} \tag{4}$$

wherein: $\mu$ is a plastic viscosity of the working fluid.

substituting the formula (2), the formula (3) and the formula (4) into the formula (1) and simplifying the formula (1) to obtain:

$$\frac{1}{r}\frac{\partial}{\partial r}\left(r\frac{\partial P}{\partial r}\right) = \frac{12\mu\left(C_\rho + \frac{\beta_f}{3}\right)}{w_0^2}\frac{\partial P}{\partial t} = \frac{1}{\eta_f}\frac{\partial P}{\partial t} \tag{5}$$

$$\eta_f = \frac{w_0^2}{12\mu\left(C_\rho + \frac{\beta_f}{3}\right)} \tag{6}$$

wherein: $n_f$ is a pressure conductivity coefficient of fluid in the fracture.

Boundary Conditions:

$$P(r, 0) = P_p \tag{7}$$

$$r\frac{\partial P(r_w, t)}{\partial r} = -\frac{6Q\mu}{\pi w_0^3 e^{\beta_f(\alpha P_w - \alpha P_p)}} \tag{8}$$

$$\lim_{r \to \infty} P(r, t) = P_p \tag{9}$$

wherein: Q is a loss rate; P(r, 0) is an intra-fracture pressure of an arbitrary radius r at an initial time; $P(r_w, t)$ is a pressure of the wellbore at any time;

$$\lim_{r \to \infty} P(r, t)$$

is an intra-fracture pressure in an infinite fracture at any time; $r_w$ is a radius of the wellbore; $P_w$ is a bottom-hole pressure.

The first model can be obtained by solving the simultaneous formulas (5)~(9):

$$P_w - P_p = -\frac{3Q\mu}{\pi w_0^3 e^{\beta_f(\alpha P_w - \alpha P_p)}} Ei\left(-\frac{r_w^2}{4\eta_f t}\right) \tag{10}$$

obtaining the static hydraulic width of the formation fracture by substituting the above data into the above calculation method of the fracture static hydraulic width.

A Second Model:

the selection method is applied to conditions that the seismic data shows that the loss space for providing the constant-pressure boundary exists in the formation, and horizontal or inclined fractures are developed in the formation.

The Derivation Process is as Follows:

neglecting the filtration loss of wall surfaces in the fracture, considering deformation characteristics of the fracture width and the compressibility of the fluid, the continuity equation of the one-dimensional radial fracture when the working fluid leaks is as follows:

$$-\frac{1}{r}\frac{\partial}{\partial r}(\rho w_h v r) = \frac{\partial(\rho w_h)}{\partial t} \tag{11}$$

for power-law fluid, an motion equation in the fracture is:

$$v = \left(\frac{n}{2n+1}\right)\left(\frac{w_h}{2}\right)^{1+\frac{1}{n}}\left(\frac{1}{k}\right)^{\frac{1}{n}}\left(-\frac{dP}{dr}\right)^{\frac{1}{n}} \tag{12}$$

wherein: n is a flow pattern index; k is a consistency coefficient.

The second model can be obtained by substituting the formula (12) into the formula (11):

$$\frac{\partial(\rho w_h)}{\partial t} = \frac{1}{r}\frac{\partial}{\partial r}(\rho w_h r v) = \left(\frac{n}{2n+1}\right)\frac{1}{k^{\frac{1}{n}}2^{1+\frac{1}{n}}}\left\{\frac{\partial}{\partial r}\left[\rho w_h^{2+\frac{1}{n}}\left(-\frac{dp}{dr}\right)^{\frac{1}{n}}\right] + \frac{1}{r}\left[\rho w_h^{2+\frac{1}{n}}\left(-\frac{dp}{dr}\right)^{\frac{1}{n}}\right]\right\} \tag{13}$$

wherein: the deformation equation of the fracture hydraulic width and the state equation of the working fluid are as follows:

$$w_h = w_0 e^{\frac{\beta_f(\alpha P - \alpha P_p)}{3}} \tag{14}$$

$$\rho = \rho_0 e^{C_\rho(P-P_p)} \tag{15}$$

boundary conditions:

$$P(r_w, t) = P_w \tag{16}$$

$$P(r_e, t) = P_p \tag{17}$$

wherein: $r_e$ is a distance between the constant-pressure loss boundary and a center of the wellbore; $P(r_e, t)$ is a pressure on the loss boundary at any time.

A loss volume is solved as follows:

$$V = 4\pi r_w \left(\frac{n}{2n+1}\right)\left(\frac{1}{k}\right)^{\frac{1}{n}} \left(\frac{w_{0i}e^{\frac{\beta_f}{3}(\alpha P_w - \alpha P_p)}}{2}\right)^{2+\frac{1}{n}} \int_0^{t_0} \left(-\frac{dP(r_w, t)}{dr}\right)^{\frac{1}{n}} dt \quad (18)$$

wherein: V is the loss volume;

$$\frac{dP(r_w, t)}{dr}$$

is a pressure gradient of the wellbore at any time that can be obtained by a difference method; $w_{0i}$ is a static hydraulic width of an i-th fracture that is set; $t_0$ is a loss time that is set.

A static hydraulic width calculation method of the fracture is as follows: setting the loss time and three or more fracture static hydraulic widths from small to large, and solving variation values of pressure gradients in the wellbore with the time under different fracture static hydraulic widths by establishing the formulas (3) to (7) and using the difference method, solving the loss volumes under the different fracture static hydraulic widths according to the formula (8), fitting the above data to obtain a relational formula between the fracture static hydraulic width and the loss volume, and calculating the static hydraulic width of the formation loss fracture, according to an actual loss volume of a mine.

A Third Model:

the selection method is applied to conditions that the seismic data shows that the loss space for providing the constant-pressure boundary exists in the formation, and vertical fractures are developed in the formation.

The Derivation Process is as Follows:

neglecting the filtration loss of wall surfaces in the fracture, considering deformation characteristics of the fracture width and the compressibility of the fluid, the continuity equation of the one-dimensional radial fracture when the working fluid leaks is as follows:

$$-\frac{\partial}{\partial x}(\rho w_h v) = \frac{\partial(\rho w_h)}{\partial t} \quad (19)$$

wherein: x is a distance from a certain point of the fracture to the wellbore.

For the power-law fluid, the motion equation in the fracture is:

$$v = \left(\frac{n}{2n+1}\right)\left(\frac{w_h}{2}\right)^{1+\frac{1}{n}}\left(\frac{1}{k}\right)^{\frac{1}{n}}\left(-\frac{dP}{dr}\right)^{\frac{1}{n}} \quad (20)$$

wherein: n is the flow pattern index; k is the consistency coefficient.

The third model can be obtained by substituting the formula (20) into the formula (19):

$$\frac{\partial(\rho w_h)}{\partial t} = \frac{\partial}{\partial x}(\rho w_h v) = \left(\frac{n}{2n+1}\right)\frac{1}{k^{\frac{1}{n}}2^{1+\frac{1}{n}}}\frac{\partial}{\partial x}\left[\rho w_h^{2+\frac{1}{n}}\left(-\frac{dp}{dx}\right)^{\frac{1}{n}}\right] \quad (21)$$

wherein: the deformation equation of the fracture hydraulic width and the state equation of the working fluid are as follows:

$$w_h = w_0 e^{\frac{\beta_f(\alpha P - \alpha P_p)}{3}} \quad (22)$$

$$\rho = \rho_0 e^{C_\rho(P - P_p)} \quad (23)$$

boundary conditions:

$$P(0,t) = P_w \quad (24)$$

$$P(x_e, t) = P_p \quad (25)$$

wherein: $x_e$ is a distance between the constant-pressure loss boundary and the wellbore; $P(0, t)$ is a pressure of the wellbore at any time during the vertical fracture loss; $P(x_e, t)$ is a pressure on the boundary at any time during the vertical fracture loss.

The loss volume is solved as follows:

$$V = 4h\left(\frac{n}{2n+1}\right)\left(\frac{1}{k}\right)^{\frac{1}{n}}\left(\frac{w_{0i}e^{\frac{\beta_f}{3}(\alpha P_w - \alpha P_p)}}{2}\right)^{2+\frac{1}{n}}\int_0^{t_0}\left(-\frac{dP(0, t)}{dx}\right)^{\frac{1}{n}} dt \quad (26)$$

wherein: h is a height of the fracture;

$$\frac{dP(0, t)}{dr}$$

is the pressure gradient of the wellbore at any time that can be obtained by the difference method.

The static hydraulic width calculation method of the fracture is as follows: setting the loss time and three or more fracture static hydraulic widths from small to large, and solving variation values of pressure gradients in the wellbore with the time under different fracture static hydraulic widths by establishing the formulas (21) to (25) and using the difference method, solving the loss volumes under the different fracture static hydraulic widths according to the formula (26), fitting the above data to obtain the relational formula between the fracture static hydraulic width and the loss volume, and calculating the static hydraulic width of the formation loss fracture, according to an actual loss volume of the mine.

Step S2, substituting the static hydraulic width of the formation fracture into a deformation formula of the fracture hydraulic width, to obtain the dynamic hydraulic width of a wellbore fracture, and the calculation method is as follows:

$$w_{hw} = w_0 e^{\frac{\beta_f(\alpha P_w - \alpha P_p)}{3}} \quad (27)$$

wherein: $w_{hw}$ is the dynamic hydraulic width of the wellbore fracture.

Step S3, converting the dynamic hydraulic width of the wellbore fracture into an average mechanical width of the wellbore fracture, according to a conversion relational formula of the mechanical width. According to Duan, yu ting's (1998) research on fluid flow behavior of rough fractures, when the mechanical width of the fractures is assumed to be normally distributed, a roughness and a contact area of the fracture surface are comprehensively considered, the average mechanical width of the fracture and the hydraulic width of the fracture are related as follows, the average mechanical width can be obtained by performing zero point calculation on the average mechanical width of the fracture.

$$w_{hw}^3 = \overline{w}_m^3 \left(1 - 1.5\frac{\sigma^2}{\overline{w}_m^2}\right)\left(\frac{1-c}{1+c}\right) \quad (28)$$

wherein: $\overline{w}_m$ is the average mechanical width of the fracture; c represents a ratio of a contact area of the fracture to a nominal area of the fracture; σ is a standard deviation of a mechanical width distribution of the fracture.

Step S4, solving a mechanical width distribution range of the fracture according to a standard deviation of the fracture mechanical width distribution of a natural fracture. A mechanical width distribution probability of the fracture is 99%, and the mechanical width distribution range of the fracture is calculated according to the following formula:

$$w_m = \overline{w}_m \pm 2.58\sigma \quad (29)$$

wherein: $w_m$ is the mechanical width distribution range of the fracture.

Whether the formation in the step S1 has the loss space can be known through the seismic data; a pore pressure can be referred to pore pressure data of adjacent wells; the deformation coefficient of the fracture hydraulic width index can be obtained by fitting experimental data of stress sensitivity of fracture rock samples; because the dynamic change of the fracture width is caused by the intra-pressure in the fracture, the Biot coefficient value is 1; the distance between the wellbore and the loss boundary is measured by a borehole trajectory and the seismic data; the plastic viscosity, the consistency coefficient and the flow pattern index of the drilling fluid are measured by a rotary viscometer; the loss time, the loss volume and the loss rate are obtained from loss data of the mine.

The standard deviation of the fracture mechanical width distribution in the step S3 can be obtained by scanning the natural fracture; the ratio of the contact area of the fracture surface to the nominal area is obtained by reconstructing the fracture space of the formation and then guiding the reconstruction into simulation software for simulation.

Comparing with the related art, the present disclosure provides advantages as below:

(1) The present disclosure considers the dynamic change of the fracture width and the roughness of the fracture surface, and has wider applicability. On the one hand, for the stress-sensitive formation, the hydraulic width of the natural fracture changes greatly with the change of the bottom hole pressure, on the other hand, the roughness of the fracture surface influences a flowing speed and a pressure distribution of the working fluid, and the calculation accuracy of a conventional fracture width calculation model is seriously reduced by the dynamic change of the fracture width and the roughness of the fracture surface. The method of the present disclosure has wider applicability after considering the dynamic change of the fracture width and the roughness of the fracture surface, and the model is suitable for all formation with stress sensitivity and considers the roughness of the fracture surface.

(2) The method of the present disclosure combines mine analysis, indoor experiments, theoretical calculation and result correction, and has systematicness, operability and timeliness. According to analysis results of the mine on the fracture occurrence, the in-situ stress and the formation pressure in the mine, an effective stress of the fracture surface of the formation can be obtained, the effective stress is taken as an initial confining pressure of an indoor experiment to simulate a situation when the drill meets the natural fracture, the accuracy and representativeness of the deformation coefficient of the fracture hydraulic width fitted by the stress sensitivity experiment of the fractured rock samples can be improved; the method for selecting and calculating the loss fracture width calculation model is provided to calculate the mechanical width distribution range of the loss fracture according to the loss data generated when loss occurs, and provide a basis for designing the particle size distribution of the plugging formula, so that the plugging formula can be designed timely and efficiently.

DETAILED DESCRIPTION

Figure 1:
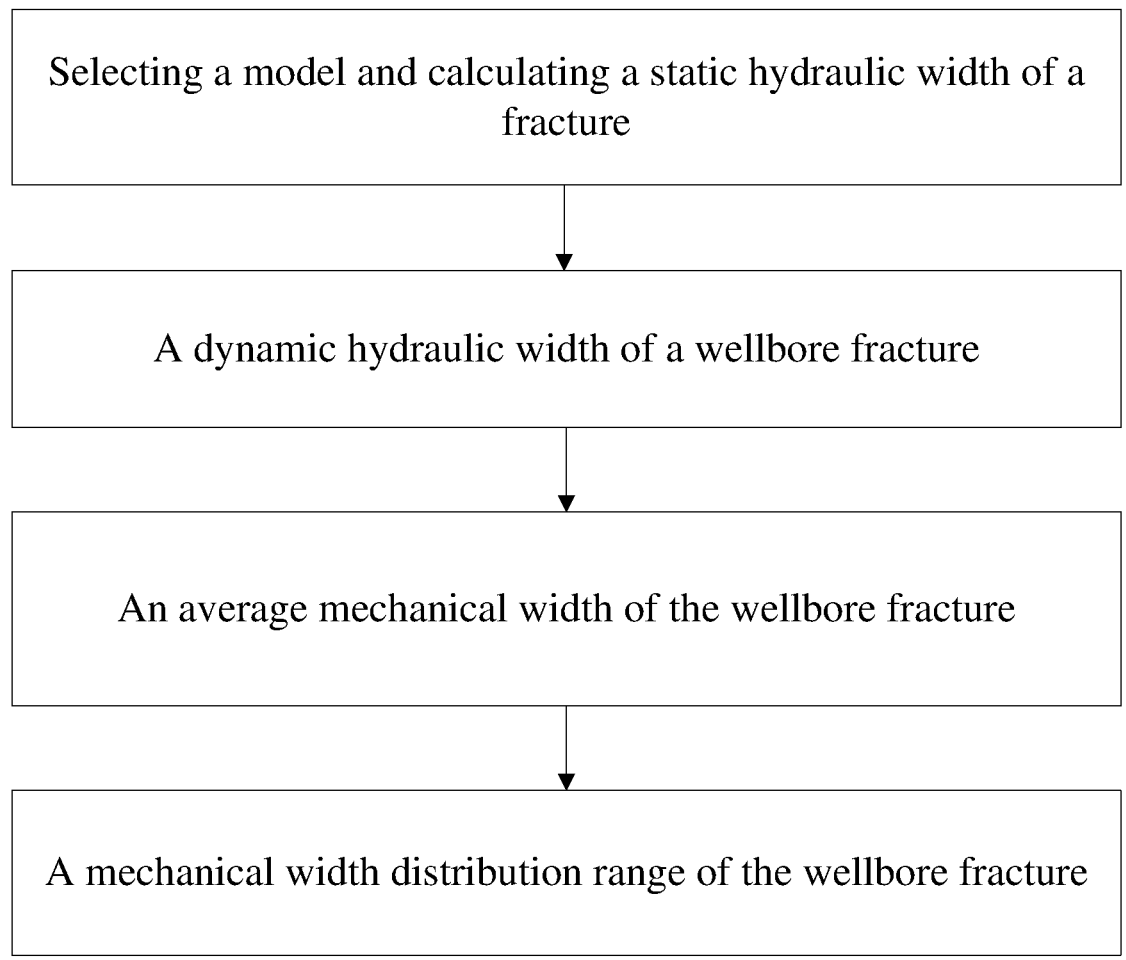
FIG. 1 is a flow chart of a dynamic fracture width calculation method for drilling fluid loss in a fractured formation in accordance with an embodiment of the present disclosure.

In order to more clearly understand and implement the present disclosure for one of ordinary skill in the related art, the principles and characteristics of the present disclosure are described on the basis of these drawings and embodiments; the examples cited are provided only to interpret the present disclosure, but not to limit the scope of the present disclosure.

A First Embodiment

The loss occurs at the bottom of the well, and specific implementation parameters are shown in the table below.

| Parameter | Value |
| --- | --- |
| Bottom hole pressure $P_w$ (MPa) | 94 |
| In situ pressure $P_p$ (MPa) | 85 |
| Radius of the wellbore $r_w$ (m) | 0.15 |
| Density of working fluid ρ (g/cm$^3$) | 1.30 |
| Deformation coefficient of the fracture hydraulic width index $β_f$ (Pa$^{-1}$) | $1 \times 10^{-7}$ |
| Plastic viscosity of working fluid μ (mPa · s) | 28 |
| Compressibility coefficient of working fluid $C_ρ$ (Pa$^{-1}$) | $4 \times 10^{-10}$ |
| Consistency coefficient K (Pa · s$^n$) | 0.15 |
| Flow pattern index n | 0.78 |
| Distance from loss boundary to wellbore $r_e$, $x_e$ (m) | 1000 |
| Height of vertical fracture (m) | 30 |
| Loss time of finite long fracture t (s) | 600 |
| Loss volume of Finite long fracture V (m$^3$) | 1.6667 |
| Standard deviation of fracture surface σ (μm) | 60 |
| Ratio of contact area to nominal area of fracture surface c | 0.3 |

A dynamic fracture width calculation method for drilling fluid loss in a fractured formation in accordance with an embodiment of the present disclosure, includes the following steps:

step 1, selecting a model according to seismic data and fracture development characteristics and calculating a static hydraulic width of a formation fracture; in order to more briefly describe three cases of the present disclosure, it is separately performed calculation on three models in the embodiment of the present disclosure.

1.1, when the seismic data shows that no loss space for providing a constant-pressure boundary exists in a formation, and horizontal or inclined fractures are developed in the formation, selecting a first model.

$$P_w - P_p = -\frac{3Q\mu}{\pi w_0^3 e^{\beta_f(\alpha P_w - \alpha P_p)}} Ei\left(-\frac{r_w^2}{4\eta_f t}\right) \quad (1)$$

$$\eta_f = \frac{w_0^2}{12\mu\left(C_\rho + \frac{\beta_f}{3}\right)} \quad (2)$$

wherein: $P_w$ is a bottom-hole pressure; $P_p$ is a formation pressure; Q is a loss rate; μ is a plastic viscosity of working fluid; $w_0$ is a fracture hydraulic width under conditions of the formation pressure, also known as a fracture static hydraulic width; $\beta_f$ is a deformation coefficient of the fracture hydraulic width that can be obtained by fitting a stress sensitivity experiment of a fracture rock sample; a is a Biot coefficient; rw is a radius of the wellbore; $\eta_f$ is a pressure conductivity coefficient of fluid in the fracture; t is a time; $C_p$ is a compressibility coefficient of working fluid.

The static hydraulic width $w_0$ of the formation fracture can be obtained to be 356 μm by substituting the above parameters into the formulas (1) and (2).

1.2, the seismic data shows that the loss space for providing the constant-pressure boundary exists in the formation, and horizontal or inclined fractures are developed in the formation, selecting a second model.

$$\frac{\partial(\rho w_h)}{\partial t} = \frac{1}{r}\frac{\partial}{\partial r}(\rho w_h r v) = \quad (3)$$

$$\left(\frac{n}{2n+1}\right)\frac{1}{k^{\frac{1}{n}}2^{1+\frac{1}{n}}}\left\{\frac{\partial}{\partial r}\left[\rho w_h^{2+\frac{1}{n}}\left(-\frac{dp}{dr}\right)^{\frac{1}{n}}\right] + \frac{1}{r}\left[\rho w_h^{2+\frac{1}{n}}\left(-\frac{dp}{dr}\right)^{\frac{1}{n}}\right]\right\}$$

wherein: a deformation equation of the fracture hydraulic width and a state equation of the working fluid are as follows:

$$w_h = w_0 e^{\frac{\beta_f(\alpha P - \alpha P_p)}{3}} \quad (4)$$

$$\rho = \rho_0 e^{C_\rho(P - P_p)} \quad (5)$$

Boundary Conditions:

$$P(r_w, t) = P_w \quad (6)$$

$$P(r_e, t) = P_p \quad (7)$$

A loss volume is solved as follows:

$$V = 4\pi r_w\left(\frac{n}{2n+1}\right)\left(\frac{1}{k}\right)^{\frac{1}{n}}\left(\frac{w_{0i}e^{\frac{\beta_f}{3}(\alpha P_w - \alpha P_p)}}{2}\right)^{2+\frac{1}{n}}\int_0^{t_0}\left(-\frac{dP(r_w, t)}{dr}\right)^{\frac{1}{n}}dt \quad (8)$$

wherein: n is a flow behavior index; k is a consistency coefficient; $r_e$ is a distance between a constant-pressure loss boundary and a center of the wellbore; $P(r_w, t)$ is a pressure of the wellbore at any time; $P(r_e, t)$ is a pressure on the loss boundary at any time; V is a loss volume;

$$\frac{dP(r_w, t)}{dr}$$

is a pressure gradient of the wellbore at any time that can be obtained by a difference method; $w_{0i}$ is a static hydraulic width of an i-th fracture that is set; $t_0$ is a loss time that is set.

Figure 3:
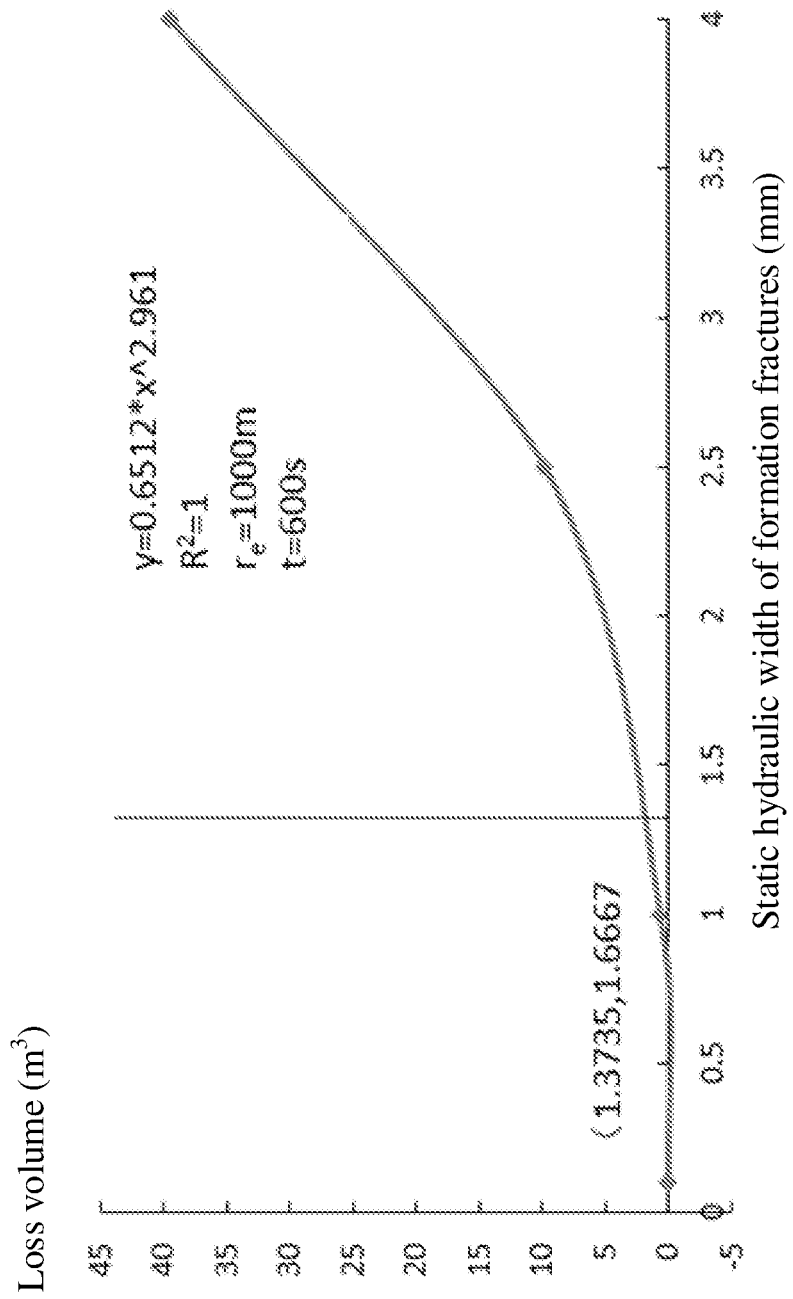
FIG. 3 is a fitting diagram of a static hydraulic width of a formation fracture in a second model of the present disclosure.

Setting the loss time to be 600 seconds, the fracture static hydraulic widths to be 0.1 mm, 1.0 mm, 2.5 mm and 4 mm, and solving variation values of the pressure gradient of the wellbore with the time under different fracture static hydraulic widths by establishing the formulas (3) to (7) and using the difference method, solving the loss volumes under the different fracture static hydraulic widths according to the formula (8), fitting data to obtain a relational formula between the fracture static hydraulic width and the loss volume, and calculating the static hydraulic width of the formation loss fracture, according to an actual loss volume of a mine. The loss volume, the relational formula between the formation static hydraulic width and the loss volume, the static hydraulic width of the formation fracture under the different static hydraulic widths of the formation fracture are shown in FIG. 3.

The static hydraulic width $w_0$ of the formation fracture is 1374 μm.

1.3, when the seismic data shows that the loss space for providing the constant-pressure boundary exists in the formation, and vertical fractures are developed in the formation, selecting a third model.

$$\frac{\partial(\rho w_h)}{\partial t} = \frac{\partial}{\partial x}(\rho w_h v) = \left(\frac{n}{2n+1}\right)\frac{1}{k^{\frac{1}{n}}2^{1+\frac{1}{n}}}\frac{\partial}{\partial x}\left[\rho w_h^{2+\frac{1}{n}}\left(-\frac{dp}{dx}\right)^{\frac{1}{n}}\right] \quad (9)$$

wherein: the deformation equation of the fracture hydraulic width and the state equation of the working fluid are as follows:

$$w_h = w_0 e^{\frac{\beta_f(\alpha P - \alpha P_p)}{3}} \quad (10)$$

$$\rho = \rho_0 e^{C_\rho(P - P_p)} \quad (11)$$

Boundary conditions:

$$P(0, t) = P_w \quad (12)$$

$$P(x_e, t) = P_p \quad (13)$$

the loss volume is solved as follows:

$$V = 4h\left(\frac{n}{2n+1}\right)\left(\frac{1}{k}\right)^{\frac{1}{n}}\left(\frac{w_{0i}e^{\frac{\beta_f}{3}(\alpha P_w - \alpha P_p)}}{2}\right)^{2+\frac{1}{n}}\int_0^{t_0}\left(-\frac{dP(0, t)}{dx}\right)^{\frac{1}{n}}dt \quad (14)$$

wherein: x is a distance from a certain point of the fracture to the wellbore; $x_e$ is a distance between the constant-pressure loss boundary and the wellbore; $P(0, t)$ is a pressure of the wellbore at any time during the vertical fracture loss; $P(x_e, t)$ is a pressure on the boundary at any time during the vertical fracture loss; h is a height of the fracture;

$$\frac{dP(0, t)}{dr}$$

is the pressure gradient of the wellbore at any time that can be obtained by the difference method.

Figure 4:
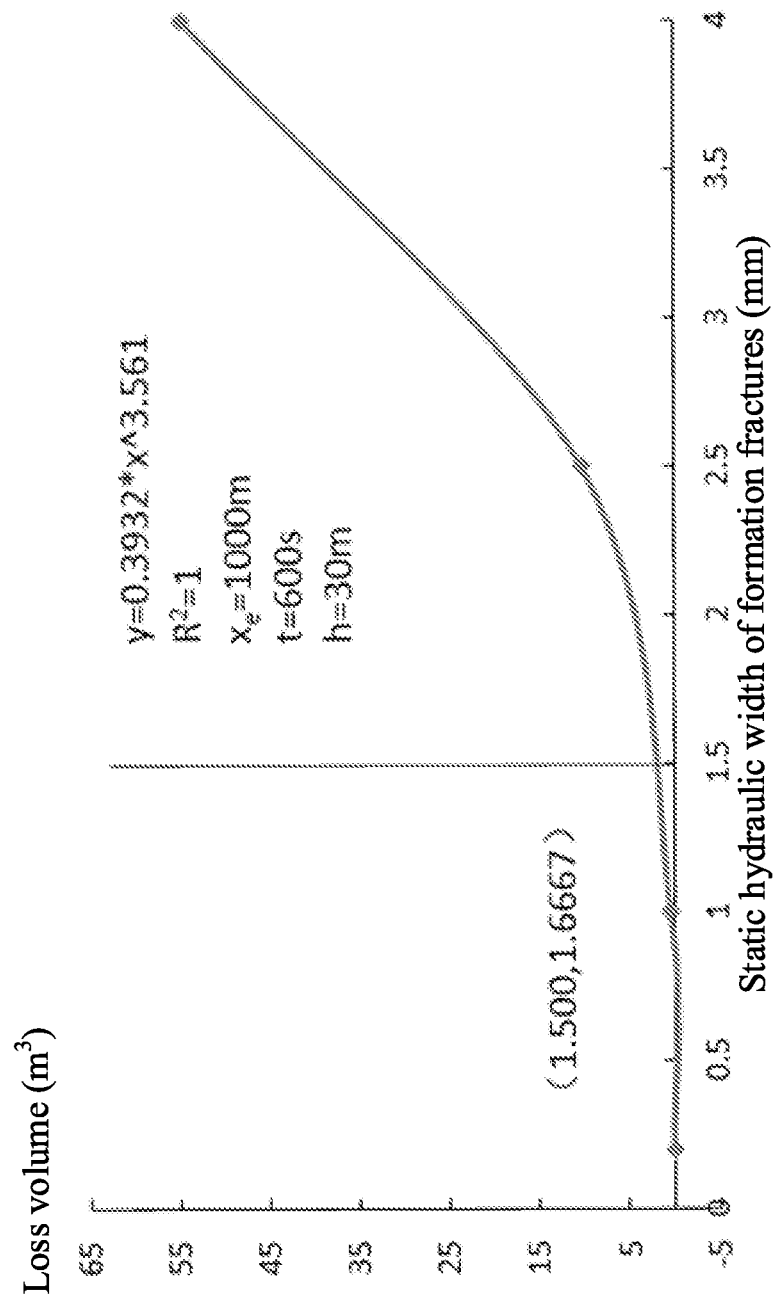
FIG. 4 is a fitting diagram of a static hydraulic width of a formation fracture in a third model of the present disclosure.

Setting the loss time to be 600 seconds, the fracture static hydraulic widths to be 0.2 mm, 1.0 mm, 2.5 mm and 4 mm, and solving variation values of the wellbore pressure gradient with the time under different fracture static hydraulic widths by establishing the formulas (9) to (13) and using the difference method, solving the loss volumes under the different fracture static hydraulic widths according to the formula (14), fitting data to obtain the relational formula between the fracture static hydraulic width and the loss volume, and calculating the static hydraulic width of the formation loss fracture, according to the actual loss volume of the mine. The loss volume, the relational formula between the static hydraulic width and the loss volume, the static hydraulic width of the formation fracture under the different fracture static hydraulic widths are shown in FIG. 4.

The fracture static hydraulic width $w_0$ is 1500 μm.

Step 2, substituting the static hydraulic width of the formation fracture into a deformation formula of the fracture hydraulic width, to obtain the dynamic hydraulic width of a wellbore fracture, wherein a calculation mode is as follows.

$$w_{hw} = w_0 e^{\frac{\beta_f(\alpha P_w - \alpha P_p)}{3}} \quad (15)$$

wherein: $w_{hw}$ is the dynamic hydraulic width of the wellbore fracture.

Figure 2:
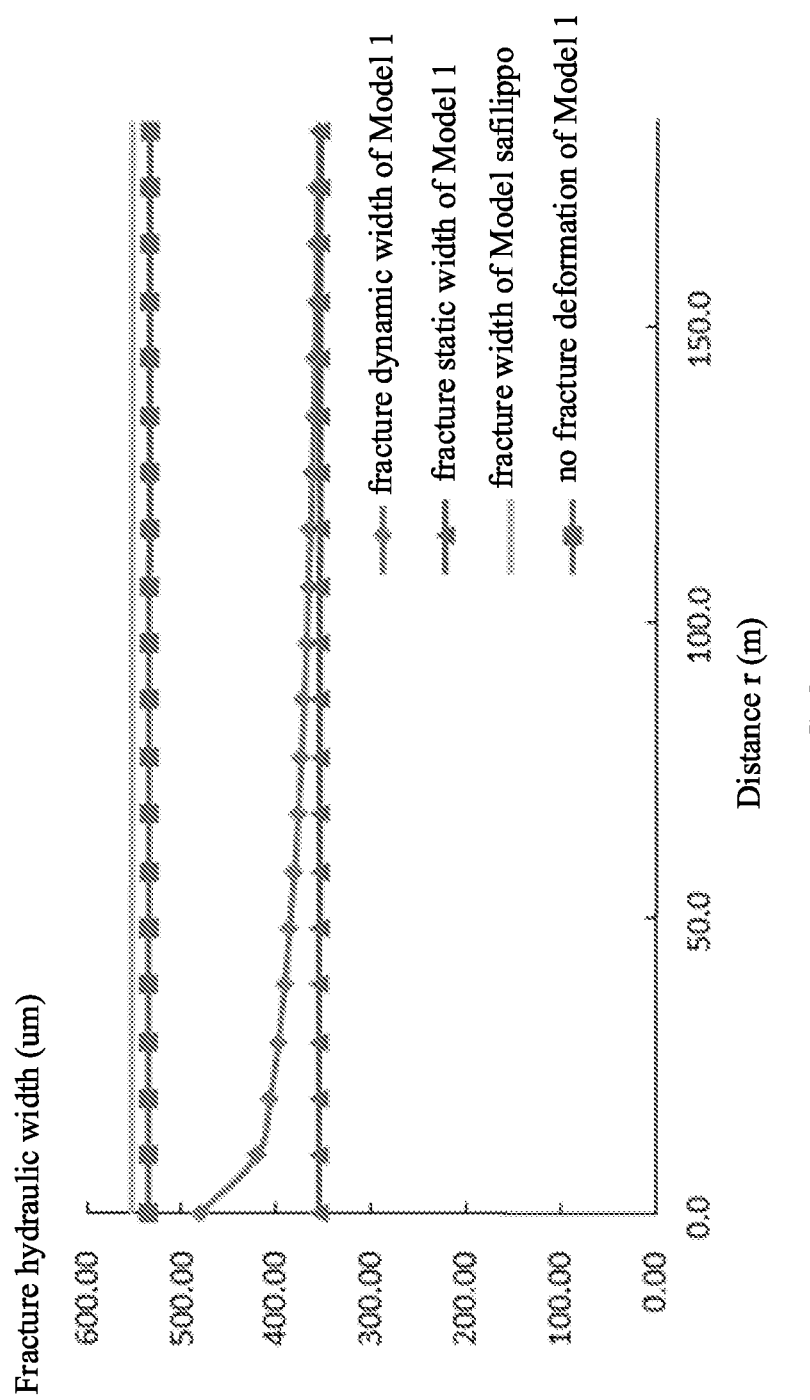
FIG. 2 is a comparison diagram of a fracture width calculated by a first model and a model sanfillippo of the present disclosure.

For the first model, the dynamic hydraulic width $w_{hw}$ of the wellbore fracture is 480 μm. It is assumed that the deformation coefficient of the fracture hydraulic width index is 0, the hydraulic width of the wellbore fracture is 536 μm through the first model. The same data is introduced into the sanfilippo model without considering the fracture deformation, the hydraulic width of the wellbore fracture is 554 μm. The above two results are similar, which indicates that the derivation process of the first model is correct and reliable, and both the calculation result of the first model and the calculation result of the sanfilippo model are shown in FIG. 2.

For the second model, the dynamic hydraulic width $w_{hw}$ of the wellbore fracture is 1855 μm.

For the third model, the dynamic hydraulic width $w_{hw}$ of the wellbore fracture is 2025 μm.

Step 3, converting the dynamic hydraulic width of the wellbore fracture into an average mechanical width of the wellbore fracture, according to a conversion relational formula of the mechanical width, wherein a calculation mode is as follows.

$$w_{hw}^3 = \overline{w}_m^3 \left(1 - 1.5\frac{\sigma^2}{\overline{w}_m^2}\right)\left(\frac{1-c}{1+c}\right) \quad (16)$$

wherein: $\overline{w}_m$ is the average mechanical width of the fracture; c represents a ratio of a contact area of the fracture to a nominal area of the fracture; σ is a standard deviation of a mechanical width distribution of the fracture.

The average mechanical width is obtained by finding a zero point of the average mechanical width $\overline{w}_m$ of the fracture.

For the first model, the average mechanical width $\overline{w}_m$ of the wellbore fracture is 593 μm.

For the second model, the average mechanical width $\overline{w}_m$ of the wellbore fracture is 2281 μm.

For the third model, the average mechanical width $\overline{w}_m$ of the wellbore fracture is 2450 μm.

Step 4, solving a mechanical width distribution range of the fracture according to the standard deviation of the mechanical width distribution of a natural fracture, wherein a calculation mode is as follows.

$$w_m = \overline{w}_m + 2.58\sigma \quad (17)$$

wherein $w_m$ is the mechanical width distribution range of the fracture.

After the average mechanical width of the fracture is brought in, it can be obtained:

for the first model, the mechanical width distribution range $w_m$ of the wellbore fracture is 438~748 μm.

for the second model, the mechanical width distribution range $w_m$ of the wellbore fracture is 2126~2436 μm.

for the third model, the mechanical width distribution range $w_m$ of the wellbore fracture is 2335~2645 μm.

The above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure.

What is claimed is:
1. A dynamic fracture width calculation method for drilling fluid loss in a fractured formation comprising the following steps:
   step S1, selecting a model according to seismic data and fracture development characteristics and calculating a static hydraulic width of a formation fracture;
   step S2, substituting the static hydraulic width of the formation fracture into a deformation formula of a fracture hydraulic width, to obtain a dynamic hydraulic width of a wellbore fracture;
   step S3, converting the dynamic hydraulic width of the wellbore fracture into an average mechanical width of the wellbore fracture, according to a conversion relational formula of a mechanical width; and
   step S4, solving a mechanical width distribution range of the fracture according to a standard deviation of a mechanical width distribution of a natural fracture, and designing a plugging formula to block the formation loss fracture, according to the mechanical width distribution range of the fracture that is obtained in the step S4; and wherein
   the step of calculating the model of the static hydraulic width of the formation fracture and selecting the model in the step S1 is as follows:
   a first model applied to conditions that the seismic data shows that no loss space for providing a constant-pressure boundary exists in a formation, and horizontal or inclined fractures are developed in the formation;

$$P_w - P_p = -\frac{3Q\mu}{\pi w_0^3 e^{\beta_f(\alpha P_w - \alpha P_p)}} Ei\left(-\frac{r_w^2}{4\eta_f t}\right) \quad (1)$$

$$\eta_f = \frac{w_0^2}{12\mu\left(C_\rho + \frac{\beta_f}{3}\right)} \quad (2)$$

wherein: $P_w$ is a bottom-hole pressure; P is a formation pressure; Q is a loss rate; μ is a plastic viscosity of working fluid; $w_0$ is a fracture hydraulic width under conditions of the formation pressure, also known as a fracture static hydraulic width; $\beta_f$ is a deformation coefficient of the fracture hydraulic width that can be obtained by fitting a stress sensitivity experiment of a fracture rock sample; α is a Biot coefficient; rw is a radius of the wellbore; $\eta_f$ a pressure conductivity coefficient of fluid in the fracture; t is a time; $C_p$ a compressibility coefficient of the working fluid;

obtaining the static hydraulic width of the formation fracture by substituting the above parameters into the formulas (1) and (2);

a second model applied to conditions that the seismic data shows that the loss space for providing the constant-pressure boundary exists in the formation, and the horizontal or inclined fractures are developed in the formation;

$$\frac{\partial(\rho w_h)}{\partial t} = \frac{1}{r}\frac{\partial}{\partial r}(\rho w_h r v) = \quad (3)$$

$$\left(\frac{n}{2n+1}\right)\frac{1}{k^{\frac{1}{n}}2^{1+\frac{1}{n}}}\left\{\frac{\partial}{\partial r}\left[\rho w_h^{2+\frac{1}{n}}\left(-\frac{dp}{dr}\right)^{\frac{1}{n}}\right] + \frac{1}{r}\left[\rho w_h^{2+\frac{1}{n}}\left(-\frac{dp}{dr}\right)^{\frac{1}{n}}\right]\right\}$$

wherein:

$$w_h = w_0 e^{\frac{\beta_f(\alpha P - \alpha P_p)}{3}} \quad (4)$$

$$\rho = \rho_0 e^{C_\rho(P-P_p)} \quad (5)$$

boundary conditions:

$$P(r_w,t)=P_w \quad (6)$$

$$P(r_e,t)=P_p \quad (7)$$

a loss volume is solved as follows:

$$V = 4\pi r_w \left(\frac{n}{2n+1}\right)\left(\frac{1}{k}\right)^{\frac{1}{n}}\left(\frac{w_{0i}e^{\frac{\beta_f}{3}(\alpha P_w - \alpha P_p)}}{2}\right)^{2+\frac{1}{n}}\int_0^{t_0}\left(-\frac{dP(r_w,t)}{dr}\right)^{\frac{1}{n}}dt \quad (8)$$

wherein: n is a flow pattern index; k is a consistency coefficient; $r_e$ is a distance between the constant-pressure loss boundary and a center of the wellbore; $P(r_w, t)$ is a pressure of the wellbore at any time; $P(r_e, t)$ is a pressure on the loss boundary at any time; V is a loss volume;

$$\frac{dP(r_w, t)}{dr}$$

is a pressure gradient of the wellbore at any time that can be obtained by a difference method; $w_{0i}$, is a static hydraulic width of an i-th fracture that is set; $t_0$ is a loss time that is set; P is a pressure at a certain point of the fracture; ρ is a density of the working fluid under the pressure P; $w_h$ is a hydraulic width of the fracture under the pressure P; r is a distance from a certain point of the fracture to the center of the wellbore under an one-dimensional radial coordinate system; v is a flowing speed of the working fluid at a certain point of the fracture; $\rho_0$ is a density of the working fluid at the formation pressure $P_p$;

setting the loss time and three or more fracture static hydraulic widths from small to large, and solving variation values of pressure gradients in the wellbore with the time under different fracture static hydraulic widths by establishing the formulas (3) to (7) and using the difference method, solving the loss volumes under the different fracture static hydraulic widths according to the formula (8), fitting data to obtain a relational formula between the fracture static hydraulic width and the loss volume, and calculating the static hydraulic width of the formation loss fracture, according to an actual loss volume of a mine;

a third model applied to conditions that the seismic data shows that the loss space for providing the constant-pressure boundary exists in the formation, and vertical fractures are developed in the formation;

$$\frac{\partial(\rho w_h)}{\partial t} = \frac{\partial}{\partial x}(\rho w_h v) = \left(\frac{n}{2n+1}\right)\frac{1}{k^{\frac{1}{n}}2^{1+\frac{1}{n}}}\frac{\partial}{\partial x}\left[\rho w_h^{2+\frac{1}{n}}\left(-\frac{dp}{dx}\right)^{\frac{1}{n}}\right] \quad (9)$$

wherein:

$$w_h = w_0 e^{\frac{\beta_f(\alpha P - \alpha P_p)}{3}} \quad (10)$$

$$\rho = \rho_0 e^{C_\rho(P-P_p)} \quad (11)$$

boundary conditions:

$$P(0,t)=P_w \quad (12)$$

$$P(x_e,t)=P_p \quad (13)$$

the loss volume is solved as follows:

$$V = 4h\left(\frac{n}{2n+1}\right)\left(\frac{1}{k}\right)^{\frac{1}{n}}\left(\frac{w_{0i}e^{\frac{\beta_f}{3}(\alpha P_w - \alpha P_p)}}{2}\right)^{2+\frac{1}{n}}\int_0^{t_0}\left(-\frac{dP(0,t)}{dx}\right)^{\frac{1}{n}}dt \quad (14)$$

wherein: x is a distance from a certain point of the fracture to the wellbore; $x_e$ is a distance between the constant-pressure loss boundary and the wellbore; P (0, t) is a pressure at the wellbore at any time during the vertical fracture loss; P ($x_e$, t) is a pressure on the boundary at any time during the vertical fracture loss; h is a height of the fracture;

$$\frac{dP(0, t)}{dr}$$

is the pressure gradient of the wellbore at any time that can be obtained by the difference method; and setting the loss time and three or more fracture static hydraulic widths from small to large, and solving variation values of the pressure gradients in the wellbore with the time under the different fracture static hydraulic widths by establishing the formulas (9) to (13) and using the difference method, solving the loss volumes under the different fracture static hydraulic widths according to the formula (14), fitting data to obtain the relational formula between the fracture static hydraulic width and the loss volume, and calculating the static hydraulic width of the formation loss fracture, according to the actual loss volume of the mine.

2. The method as claimed in claim 1, wherein the step of calculating the dynamic hydraulic width of the wellbore fracture in the step S2 is as follows:

$$w_{hw} = w_0 e^{\frac{\beta_f(\alpha P_w - \alpha P_p)}{3}} \quad (15)$$

wherein: $w_{hw}$ is the dynamic hydraulic width of the wellbore fracture; $w_0$ is the fracture hydraulic width under conditions of the formation pressure, also known as the fracture static hydraulic width; $\beta_f$ is the deformation coefficient of the fracture hydraulic width that can be obtained by fitting the stress sensitivity experiment of the fractured rock sample; $\alpha$ is the Biot coefficient; $P_w$ is the bottom-hole pressure; $P_p$ is the formation pressure.

3. The method as claimed in claim 1, wherein the step of calculating the average mechanical width of the wellbore fracture in the step S3 is as follows, the average mechanical width is obtained by finding a zero point of the average mechanical width of the fracture:

$$w_{hw}^3 = \overline{w}_m^3 \left(1 - 1.5\frac{\sigma^2}{\overline{w}_m^2}\right)\left(\frac{1-c}{1+c}\right) \quad (16)$$

wherein: $\overline{w}_m$ is the average mechanical width of the fracture; c represents a ratio of a contact area of the fracture to a nominal area of the fracture; $\sigma$ is a standard deviation of a mechanical width distribution of the fracture; $w_{hw}$ is the dynamic hydraulic width of the wellbore fracture.

4. The method as claimed in claim 1, wherein the step of solving the mechanical width distribution range in the step S4 is as follows:

$$w_m = \overline{w}_m \pm 2.58\sigma \quad (17)$$

wherein: $w_m$ is the mechanical width distribution range of the fracture; $\overline{w}_m$ is the average mechanical width of the fracture; $\sigma$ is the standard deviation of the mechanical width distribution of the fracture.

* * * * *